June 13, 1933.  A. H. HANDLAN  1,913,545
SIGNAL LAMP
Filed Nov. 7, 1930

INVENTOR
A. H. HANDLAN
By J. S. Cook
ATTORNEY

Patented June 13, 1933

1,913,545

UNITED STATES PATENT OFFICE

ALEXANDER H. HANDLAN, OF ST. LOUIS, MISSOURI

SIGNAL LAMP

Application filed November 7, 1930. Serial No. 494,000.

This invention relates generally to signal lamps and more particularly to the construction of the ventilators of signal lamps, the predominant object of the invention being to produce a signal lamp which is provided with a ventilator of such improved construction that the passage of air currents into the lamp body is efficiently controlled.

It is a fact well known by lamp manufacturers that to produce a signal lamp of entirely satisfactory construction, it is absolutely necessary that the ventilator of the lamp be of the greatest simplicity and so constructed as to really and efficiently equalize the air currents that enter into the lamp body, and the air currents that flow from the lamp body. It is also necessary to so construct the ventilator as to eliminate the possibility of the extinguishment of the flame in the lamp by violent blasts of air caused by high winds and to counteract and proportionately dispel such blasts when they enter materially into the interior of the lamp body so that only so much of the air as is necessary to support combustion in the burner chamber in the lamp will find entrance thereinto and the remainder, or superfluous air, forced into the ventilator will escape therefrom without entering the burner chamber.

My ventilator is designed to fulfill all of the requirements herein mentioned and is so constructed as to render its manufacture inexpensive and the assemblage of its parts such that the assemblage may be carried out by unskilled labor.

Figure 1:
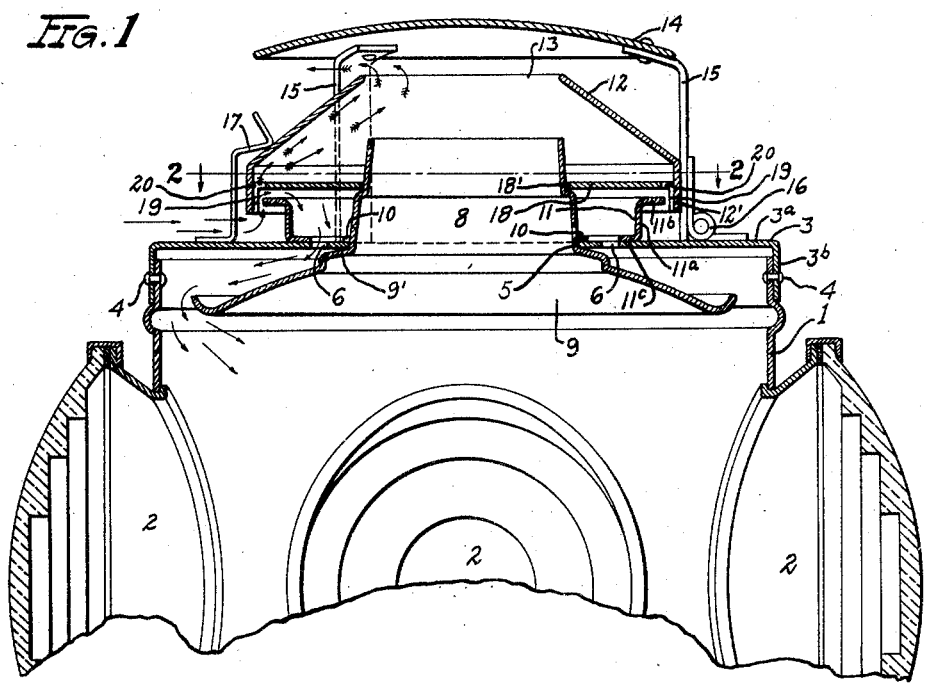
Figure 1 is a fragmentary vertical section of a signal lamp provided with my improved ventilator construction.

In the drawing, wherein is shown for the purpose of illustration, merely, one embodiment of the invention 1 designates the body shell of a signal lamp provided with the usual lens apertures 2. This shell may be of ordinary description as no invention is herein claimed therefor.

Figure 2:
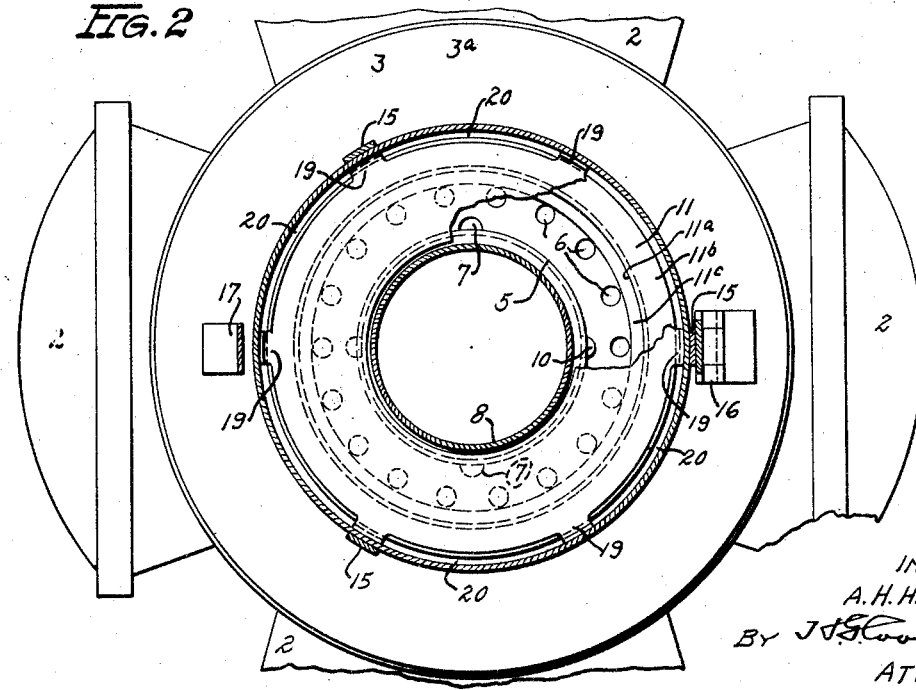
Figure 2 is a horizontal section taken on line 2—2 of Figure 1.

3 designates the base of my improved ventilator, said base comprising a horizontal wall 3ª and a downwardly extended circumferential flange 3ᵇ. The circumferential flange 3ᵇ of the base 3 embraces the upper end portion of the wall of the body shell 1, as shown in Figure 1, and suitable fastening devices 4 secure said ventilator base to said body shell. The horizontal wall 3ª of the ventilator base 3 is provided with a centrally located opening 5, and said horizontal wall is also provided with a plurality of spaced apertures 6 formed preferably in a circular row. Formed at the edge of the central opening 5 in the horizontal wall 3ª is a pair of oppositely disposed notches 7, said notches being open at the edge of said opening and preferably being of semicircular shape as shown in Figure 2.

8 designates the flue of the lamp ventilator and formed integral with said flue at the lower end thereof is a bell 9. The flue 8 is disposed above the horizontal wall 3ª of the ventilator base 3, while the bell 9 is disposed beneath said horizontal wall, and said flue and bell are in complete communication with each other. The integral structure which provides the flue and the bell of the ventilator is provided with U-shaped slits and the metal within these slits is bent outwardly to provide horizontally disposed lips 10, said lips being arranged in diametrically opposed relation with respect to each other as shown clearly in Figure 2. When the integral structure which provides the flue 8 and bell 9 of the ventilator is being arranged in place in the ventilator structure, said integral structure is passed into the body of the lamp through one of the lens apertures 2. The flue portion of the integral structure which, as shown in Figure 1, tapers inwardly slightly, is passed upwardly through the central opening 5 in the horizontal wall 3ª of the ventilator base 3, said integral structure being disposed in such position that the lips 10 will pass through the notches 7 at the edge of said central opening. The upward movement of the integral structure with respect to the horizontal wall 3ª of the ventilator base 3 will be arrested by the top face 9' of the bell 9 contacting with the bottom face of the horizontal wall 3ª at which time the bottom faces of the lips 10 are in approximately the same horizontal plane as the top face of the horizontal wall 3ª. The integral structure is then rotated about its vertical axis so as to offset the lips 10 with respect to the notches 7 whereby the integral structure will be securely fixed to the horizontal wall 3ª.

Secured to the top face of the horizontal wall 3ª is an annular element 11 which is substantially Z-shaped in cross-section; that is to say, said element in cross-section comprises a substantially vertical wall portion 11ª, an outwardly extended annular flange 11ᵇ at the upper end of said vertical wall, and an inwardly extended annular flange 11ᶜ at the lower end of said vertical wall. The element 11 is secured to the horizontal wall of the ventilator base 3 by any suitable means; for instance, this attachment may be accomplished by spot welding the flange 11ᶜ to said horizontal wall. Preferably the element 11 is secured to the horizontal wall 3ª in such position that the apertures 6 formed through said horizontal wall are within the annular element 11.

Arranged above the flue 8 of the ventilator is a frusto-conical wind guard 12 which includes an annular downwardly extended flange portion 12' at its bottom. The wind guard 12 is open at its top as indicated at the point designated by the reference character 13, and located above the opening at the top of said wind guard is a cap piece 14. The cap piece 14 and the wind guard 12 are secured together by a plurality of vertically disposed strips of metal 15, said cap piece and said wind guard being suitably secured to said strips and the strips being extended downwardly a sufficient distance so as to contact with the top face of the horizontal wall of the ventilator when the wind guard and cap piece are in their normal operative positions as illustrated in Figure 1.

The structure comprised of the wind guard and cap piece is hingedly attached to the horizontal wall 3ª of the ventilator by a suitable hinge 16. Also at a point diametrically opposed to the point of location of the hinge 16 the ventilator is provided with a suitable catch 17 to lock the wind guard and cap piece in their lowered positions.

The annular flange portion 12' of the wind guard embraces the flange portion 11ᵇ of the annular element 11; that is to say the lower edge of said flange portion 12' is located in a horizontal plane lower than the horizontal plane in which the flange 11ᵇ is disposed. Also a plate 18 is located within the flange portion 12' of the wind guard and this plate is located above the upper flange 11ᵇ of the annular element 11. The plate 18 is provided with a central opening 18' through which the flue 8 extends, and said plate is also provided with a plurality of circumferentially spaced, downwardly projected extensions 19 which are suitably secured to the flange portion 12' of the wind guard 12 at the inner face thereof. Along its marginal edge the plate 18 is cutaway to provide a plurality of arcuate apertures 20 (Figure 2), said apertures being the space between the inner edge of the cutaway portions and the adjacent portions of the inner face of the flange portion 12' of the wind guard.

My signal lamp is one intended especially for use upon railway trains, in which use the lamp is constantly, during movement of the train, subjected to strong blasts or drafts of air. The air striking the ventilator of the lamp moves upwardly and passes into the ventilator through the space between the outer edge of the flange 11ᵇ of the annular element 11 and the inner face of the flange portion 12' of the wind guard 12 as indicated by unfeathered arrows in Figure 1. Some of this air passes around the flange portion 11ᵇ of the element 11 and moves downwardly through the apertures 6 into the body of the lamp wherein said air passes around the outer edge of the bell 9 and moves into the burner chamber where said air serves to support combustion within said burner chamber. Due to the fact that there is a strong current of air across the top of the wind guard 12 suction is created in the ventilator by reason of which a considerable portion of the air entering into the ventilator is constantly drawn upwardly through the arcuate apertures 20 as suggested by the feathered arrows in Figure 1, and instead of passing downwardly into the burner chamber to the great detriment of the flame burning therein this excess air is exhausted from the ventilator at the opening at the top of the wind guard. Thus it is plain that only sufficient air necessary to support combustion in the burner chamber is permitted to pass into said burner chamber, the excess air passing freely from the open upper end of the wind guard.

Because the element 11 includes the upper outwardly extended flange 11ᵇ a baffle is provided which prevents rain water from finding its way into the ventilator, as this flange will not permit of rain water washing up over the vertical wall of the element 11 and thus passing into the ventilator where it may pass downwardly into the body of the lamp through the apertures 6.

I claim:

1. A signal lamp comprising a burner chamber, a ventilator arranged above said burner chamber, said ventilator comprising a base, a wind guard disposed in spaced relation with respect to said base to provide a space for the entrance of air, an upstanding member fixed to said base and arranged to baffle passage of air moving through the space between said base and said wind guard, and a plate arranged within said wind guard immediately above and spaced from said upstanding member, said plate and said base being provided with apertures for the passage of air, and the arrangement of said plate with respect to said upstanding member being such that air is deflected thereby downwardly about said upstanding member and through the apertures in said base into said burner chamber.

2. A signal lamp comprising a burner chamber, a ventilator arranged above said burner chamber, said ventilator comprising a base, a wind guard disposed in spaced relation with respect to said base to provide a space for the entrance of air, an upstanding member fixed to said base and arranged to baffle passage of air moving through the space between said base and said wind guard, said upstanding member including a substantially horizontally disposed flange portion located within said wind guard, and a plate arranged within said wind guard and spaced from said upstanding member, said plate and said base being provided with apertures for the passage of air, and the arrangement of said plate with respect to said upstanding member being such that air is deflected thereby downwardly about said upstanding member and through the apertures in said base into said burner chamber.

3. A signal lamp comprising a burner chamber, a ventilator arranged above said burner chamber, said ventilator comprising a base, a wind guard disposed in spaced relation with respect to said base to provide a space for the entrance of air, an upstanding member fixed to said base and arranged to baffle passage of air moving through the space between said base and said wind guard, said upstanding member including a substantially vertical wall portion and a substantially horizontal flange portion located at the upper end of said substantially vertical wall portion, and a plate arranged within said wind guard and spaced from said upstanding member, said plate and said base being provided with apertures for the passage of air, and the arrangement of said plate with respect to said upstanding member being such that air is deflected thereby downwardly about said upstanding member and through the apertures in said base into said burner chamber.

4. A signal lamp comprising a burner chamber, a ventilator arranged above said burner chamber, said ventilator comprising a base, a wind guard disposed in spaced relation with respect to said base to provide a space for the entrance of air, an upstanding member fixed to said base and arranged to baffle passage of air moving through the space between said base and said wind guard, said upstanding member including a substantially vertical wall portion and a substantially horizontal outwardly extended flange portion located at the upper end of said substantially vertical wall portion, and a plate arranged within said wind guard and spaced from said upstanding member, said plate and said base being provided with apertures for the passage of air, and the arrangement of said plate with respect to said upstanding member being such that air is deflected thereby downwardly about said upstanding member and through the apertures in said base into said burner chamber.

5. A signal lamp comprising a burner chamber, a ventilator arranged above said burner chamber, said ventilator comprising a base, a wind guard disposed in spaced relation with respect to said base to provide a space for the entrance of air, an upstanding member fixed to said base and arranged to baffle passage of air moving through the space between said base and said wind guard, and a plate arranged within said wind guard and spaced from said upstanding member, said plate and said base being provided with apertures for the passages of air, the apertures formed in the plate being of arcuate formation and being located at the marginal edge of said plate, and the arrangement of said plate with respect to said upstanding member being such that air is deflected thereby downwardly about said upstanding member and through the apertures in said base into said burner chamber.

6. A signal lamp comprising a burner chamber, a ventilator arranged above said burner chamber, said ventilator comprising a base, a wind guard disposed in spaced relation with respect to said base to provide a space for the entrance of air, an upstanding member fixed to said base and arranged to baffle passage of air moving through the space between said base and said wind guard, a plate arranged within said wind guard and spaced from said upstanding member, said plate and said base being provided with apertures for the passage of air, and a structure providing the ventilator with a flue, said structure being detachably secured to said base, and the arrangement of said plate with respect to said upstanding member being such that air is deflected thereby downwardly about said upstanding member and through the apertures in said base into said burner chamber.

7. A signal lamp comprising a burner chamber, a ventilator arranged above said burner chamber, said ventilator comprising a base, a wind guard disposed in spaced relation with respect to said base to provide a space for the entrance of air, an upstanding member fixed to said base and arranged to baffle passage of air moving through the space between said base and said wind guard, a plate arranged within said wind guard and spaced from said upstanding member, said plate and said base being provided with apertures for the passage of air, and a structure providing the ventilator with the flue and a bell, and means comprising projected elements on said structure adapted to engage said base whereby said structure is detachably secured to said base, and the arrangement of said plate with respect to said upstanding member being such that air is deflected thereby downwardly about said upstanding member and through the apertures in said base into the burner chamber.

In testimony that I claim the foregoing I hereunto affix my signature.

ALEXANDER H. HANDLAN.